United States Patent [19]
Bayer

[11] 3,725,784
[45] Apr. 3, 1973

[54] AUTOMATIC CALIBRATING AND MEASURING SYSTEM
[75] Inventor: Herbert Bayer, Reutlingen, Germany
[73] Assignee: Wandel u. Goltermann, Reutlingen, Germany
[22] Filed: June 7, 1971
[21] Appl. No.: 150,438

[30] Foreign Application Priority Data

June 24, 1970 Germany..................P 20 31 045.6

[52] U.S. Cl....................................324/130, 324/74
[51] Int. Cl..............................G01r 1/02, G01r 1/38
[58] Field of Search.............324/130, 120, 74; 330/9

[56] References Cited

UNITED STATES PATENTS 3,105,230   9/1963   MacIntyre............................324/130
3,196,348   7/1965   Parker..................................324/120

Primary Examiner—Rudolph V. Rolinec
Assistant Examiner—Ernest F. Karlsen
Attorney—Karl F. Ross

[57] ABSTRACT

A system with a test position for measuring the amplitude (or phase) of an incoming signal wave of predetermined frequency is repetitively switched over to a calibrating position in which the system receives a reference oscillation of constant frequency and phase for automatically readjusting its circuits, if necessary. If the input signal disappears or drops below a certain minimum level, a sensing circuit reduces the rate of switchover or arrests the system in test position to reduce wear of the relay contacts employed therefor. A random or quasi-random change in that rate may be utilized to prevent false indications due to the stroboscopic effect of periodic switchover in the presence of a modulating frequency close to the switching rate.

8 Claims, 6 Drawing Figures

Herbert Bayer
INVENTOR.

BY
Karl F. Ross
Attorney

Herbert Bayer
INVENTOR.

BY
Karl F. Ross
Attorney

AUTOMATIC CALIBRATING AND MEASURING SYSTEM

My present invention relates to an automatic calibrating and measuring system of the general type described in my prior U.S. Pat. Nos. 3,461,385 and 3,486,112.

In such a system, an incoming signal wave of predetermined frequency is intermittently fed to a selector circuit which passes that frequency to a detector to energize an amplitude indicator, such as a voltmeter; between samplings of this signal wave the system is switched to a calibrating position in which a reference oscillation travels over the same path to a sensing circuit controlling that path to adjust its impedance characteristic, if necessary. An analogous system may be used to measure phase rather than amplitude, with substitution of a phase comparator for the detector; the phase comparator may be preceded by an adjustable phase shifter under the control of the sensing circuit. Reference in this connection may also be made to commonly owned application Ser. No. 737,544, filed by me jointly with Peter Harzer, Gunther Hoffmann and Bernd Zabel on June 17, 1968, now patent U.S. Pat. No. 3,584,295, which discloses a system of this type including a digital attenuator and a digital phase shifter whose settings can be readjusted during a recurrent calibration interval. As will be apparent from this earlier disclosure, the two signal parameters (amplitude and phase) could be measured simultaneously in the same system.

The switchover of the selector network between its calibrating and test positions occurs relatively frequently, e.g., at a rate of 1 cycle per second. Thus, testing intervals of 0.9-second duration may alternate with calibration intervals of 0.1-second duration. This alternation generally continues also during periods of idleness, i.e., in the absence of the signal to be monitored; as a result, the contacts of the switching relays are subjected to rather rapid wear.

It is, therefore, an important object of my present invention to provide a system of this general type in which a rapid switchover between calibrating and test positions occurs only during actual measurements, thereby increasing the service life of the circuit elements involved.

Occasionally, with periodic switchover at regular intervals as in the prior systems referred to, the switching rate is close to the fundamental or a subharmonic of a low-frequency modulation of the signal wave to be monitored. This results in a stroboscopic effect leading to a slow variation in the measured parameter (amplitude or phase) at a beat frequency corresponding to the difference between the switching frequency and the modulating frequency or its subharmonic. The system, reacting to this beat frequency, introduces unnecessary and undesirable corrective measures.

Another object of my invention, therefore, is to provide means in such a system for suppressing the above-described stroboscopic effect.

Both these objects are realized, pursuant to my present invention, by the provision of a timing circuit which establishes the alternating calibration and testing intervals and whose operation is subject to modification by a voltage-responsive control circuit. By applying to this control circuit an input voltage depending upon the magnitude of the incoming signal voltage, as determined by a conventional threshold device such as a differential amplifier, I can slow down the rate of switchover (or, as a limiting case, arrest the timer with the system in its test position) as long as the integrated signal amplitude does not rise to a predetermined minimum level. On the other hand, the switchover rate could be continually changed in a random or quasi-random fashion within certain limits (e.g., between 0.5 and 1.5 cycles per second) by applying to the control circuit an irregularly varying input voltage derived, for example, from a white-noise generator.

The above and other features of my invention will be described in detail hereinafter with reference to the accompanying drawing in which.

Figure 1:
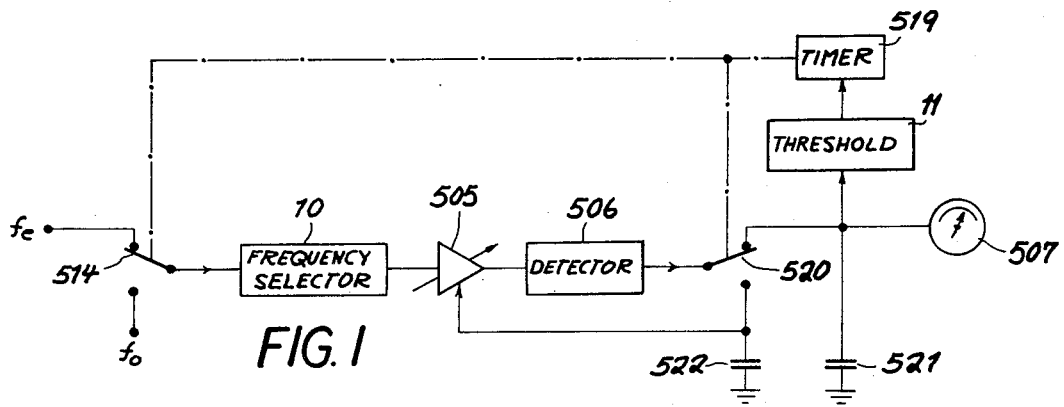
FIG. 1 is an overall block diagram of a first embodiment.
Figure 5:
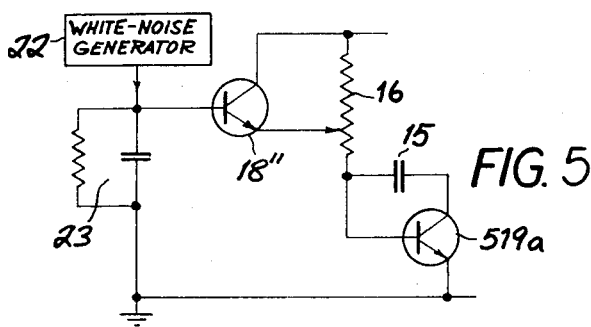
FIG. 5 illustrates another partial modification of that circuit diagram.

In FIG. 1 I have shown a system broadly similar to that of FIG. 5 of each of my two above-identified prior patents, the same reference numerals having been used where applicable. Thus, in the illustrated test position of that system, a signal voltage of predetermined frequency $f_e$ is fed via a switch 514 to a selector network 10 working into an adjustable amplifier 505 whose output is delivered to a detector 506; another switch 520, ganged with switch 514, transmits the detector output to a voltmeter 507 and to a smoothing capacitor 521 in parallel therewith.

In the alternate position of switches 514 and 520, a locally generated reference oscillation of fixed frequency $f_o$ is applied to the input of frequency selector 10 while the output of detector 506 goes to a storage capacitor 522 forming part of a sensing circuit and controlling the gain of amplifier 505. (Instead of a variable-gain amplifier, a variable attenuator could be used as described in the above-identified application Ser. No. 737,544.) The periodic reversal of switches 514 and 520 is controlled by a timer 519.

In accordance with the present invention, I connect a threshold device 11 to the output of detector 506, in parallel with meter 507. During each calibrating interval the timer 519, controlled by the threshold device 11, operates at its normal rate (e.g., 1 c.p.s.) as long as the signal voltage as integrated by the detector equals or exceeds a predetermined minimum level. Whenever the signal voltage falls below that level, device 11 trips the timer 519 to lengthen the testing interval by, say, a factor of 100 without affecting the length of the calibration interval.

Figure 2:
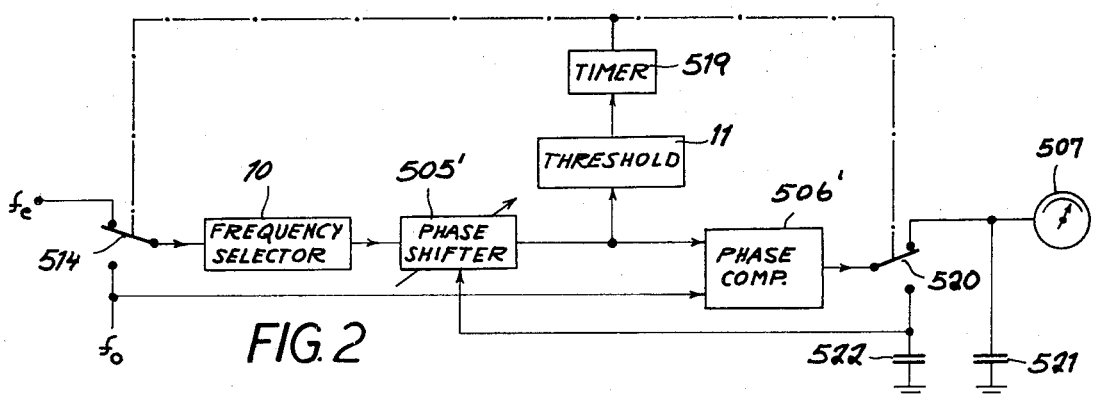
FIG. 2 is a similar block diagram of a second embodiment.

FIG. 2 shows a similar system, differing from that of FIG. 1 by the substitution of an adjustable phase shifter 505' and a phase comparator 506' for the variable-gain amplifier 505 and the detector 506. With switches 514 and 520 in their illustrated testing position, a unipolar voltage proportional to the phase difference between signal wave $f_e$ (as modified by phase shifter 505') and reference wave $f_o$ is delivered by comparator 506' to meter 507 here serving as a phase indicator. In the calibration position, capacitor 522 accumulates a charge whose magnitude, if deviating from a standard, readjusts the phase shifter 505' in the same manner as amplifier 505 of FIG. 1 is adjusted by an analogous deviation, as more fully described in application Ser. No. 737,544.

In FIG. 2 the threshold device 11, responding to a parameter (amplitude) different from the one to be measured (phase), is connected to the transmission circuit between switches 514 and 520 at a location ahead of phase comparator 506', i.e. in the output of phase shifter 505'. Again, a drop in signal voltage below a predetermined level modifies the operation of timer 519 as described above.

Figure 3:
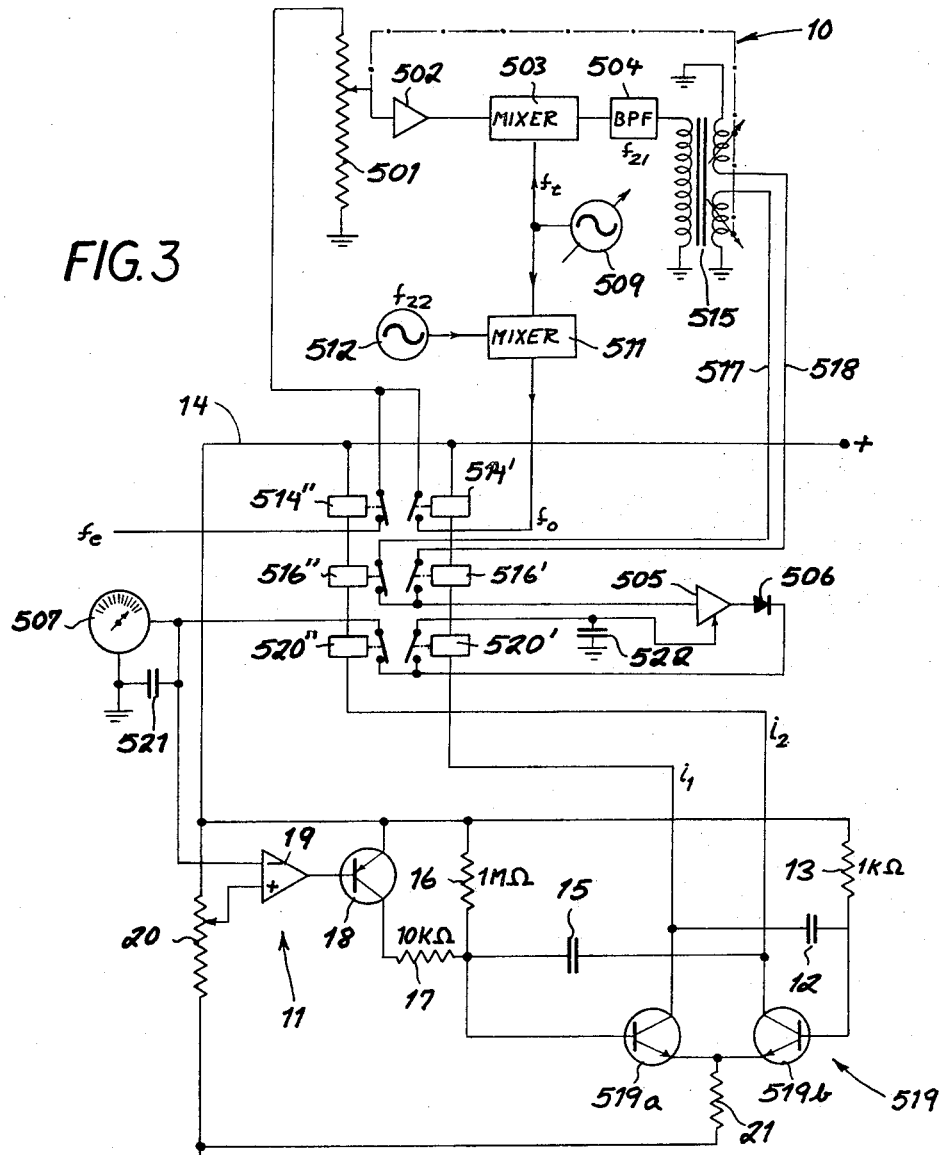
FIG. 3 is a more detailed circuit diagram for the embodiment of FIG. 1.

FIG. 3 shows details of circuit 10, threshold device 11 and timer 519 in the system of FIG. 1. Circuit 10 includes a number of elements shown in FIG. 5 of my two prior patents, i.e. an input potentiometer 501, an amplifier 502 and a mixer 503 which receives a locally generated test frequency $f_t$ from an adjustable oscillator 509 and supplies a beat frequency $f_{z1} = f_t - f_e$ to a band-pass filter 504 centered on that beat frequency. The filter output energizes a transformer 515 with two secondary windings having output leads 517 and 518; these secondary windings are ganged with the slider of potentiometer 501 for compensatory adjustment of their output voltages. Test frequency $f_t$ is also delivered to a mixer 511 receiving another locally generated frequency $f_{z2}$ from an oscillator 512 to synthesize therefrom the reference frequency $f_o = f_t - f_{z2}$.

The switches 514 and 520 of FIG. 1 have been represented in FIG. 3 by paired armatures of respective relay pairs 514', 514" and 520' and 520" connected, in series with another relay pair 516', 516", in the collector leads of two NPN transistors 519a, 519b forming respective sections of an astable multivibrator which is part of the timer 519. The collector of transistor 519a and the base of transistor 519b are cross-coupled via a condenser 12 which forms part of an R/C circuit also including a resistor 13 connected between that base and a positive bus bar 14. A similar reactive network comprises a condenser 15 coupling the collector of transistor 519b to the base of transistor 519a, a high-ohmic resistor 16 between that base and bus bar 14, and a low-ohmic resistor 17 connected across resistor 16 in series with a normally saturated PNP transistor 18. As is well known, the time constant of each of these R/C networks is determined by the magnitudes of the capacitances 12, 15 and of the associated charging resistances 13, 16 and 17, the time constant of multivibrator section 519a being thus sharply increased whenever the transistor 18 is cut off to disconnect the shunt path through low-ohmic resistor 17. If, with equal capacitances, the resistances 13, 16 and 17 are in the ratio of 1:1000:10 (e.g., of magnitudes 1 KΩ, 1 MΩ and 10 KΩ, respectively), a similar ratio will exist between the invariable time constant of the right-hand half and the two alternate time constants of the left-hand half of the multivibrator. This has been illustrated in FIG. 6 where graphs (a) and (b) show the periods $T_1$ and $T_2$ of current flow $i_1$ and $i_2$ through transistors 519a and 519b, respectively, with transistor 18 conducting to lower the time constant of the left-hand multivibrator section; graphs (c) and (d) show the two currents with transistor 18 cut off, it being noted that the period $T_1$ of conductivity of transistor 519a has remained unchanged but that the corresponding period of transistor 519b has been lengthened to a value $T_2'$ equaling a multiple of period $T_2$. In keeping with the example previously given, we may assign to these periods the values $T_1 = 0.1$ sec, $T_2 = 0.9$ sec and $T_2' \approx 100$ sec.

The conduction of ancillary transistor 18 is controlled by a differential amplifier 19 which forms part of threshold device 11 and has its noninverting input (+) connected to a potentiometer 20 between bus bar 14 and ground. The inverting input (−) of amplifier 19 is connected in parallel with the input of meter 507 so as to be energized from the output of amplifier 505 via detector 506 by way of closed contacts of relay 520" whenever current $i_2$ flows through transistor 519b. Under these conditions, relays 514" and 516" are also operated to attract their armatures and complete the circuits from the source of input voltage $f_e$ to potentiometer 501 and from transformer output lead 517 to the input of amplifier 505 whereby testing may proceed as described in my prior patents referred to. During this period of conductivity of transistor 519b, condenser 15 progressively charges through resistors 16 and 17 to drive the base of transistor 519a sufficiently positive to trip the multivibrator 519; transistor 519a now conducts, applies a negative cut-off pulse to the base of transistor 519b through coupling condenser 12, and energizes the relays 514', 516' and 520' in lieu of their companion relays to switch the system to its calibrating position. This situation endures until, after an interval $T_1$ determined by the time constant of network 12, 13, condenser 12 has recharged sufficiently to restore the multivibrator to its previous condition, thereby driving the base of transistor 519a negative and commencing another charging period for condenser 15.

Figure 6:
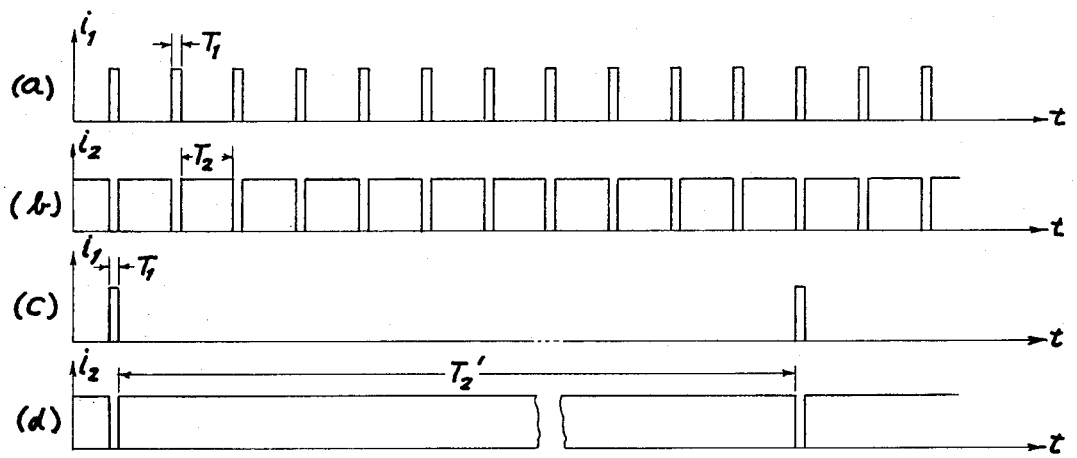
FIG. 6 is a set of graphs relating to the operation of the system of FIG. 3.

If the output voltage of detector 506 stored on capacitor 521 drops below its critical value, the output of differential amplifier 19 goes positive and blocks the ancillary transistor 18 so that condenser 15 can charge only through resistor 16 during the next cycle. This accounts for the lengthening of the test interval from $T_2$ to $T_2'$ as shown in FIG. 6.

Since, with the illustrated pairing of relays 514', 514" etc., their armatures need not be provided with back contacts, these armatures and their front contacts can be designed as sensitive reed switches. As long as bus bar 14 remains energized, one contact of each pair always makes while the other one breaks: if power fails, all relay contacts are open.

The emitters of transistors 519a and 519b are shown grounded through a common resistor 21 to help maintain the astable condition of the multivibrator.

Figure 4:
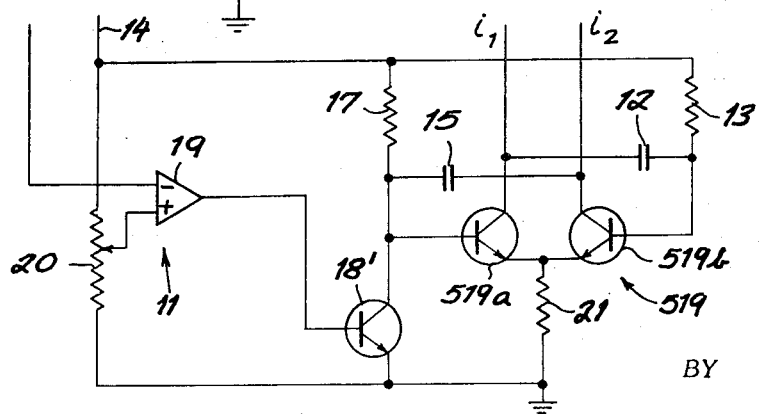
FIG. 4 shows a partial modification of the circuit diagram of FIG. 3.

In FIG. 4 a modification of the circuit of FIG. 3 is shown (illustrated only in part) in which an ancillary NPN transistor 18' is connected between ground and the base of transistor 519a. As long as the signal $f_e$ (FIG. 3) comes in strong, transistor 18' is cut off and the multivibrator 519 operates at a switchover rate determined by the time constants of reactive networks 12, 13 and 15, 17 (the high-ohmic resistor 16 having been omitted in this modified system). When the signal falls below the critical level, transistor 18' is turned on to prevent the charging of condenser 15 to a potential which would drive the transistor 519a into conduction; thus, multivibrator section 519b remains continuously energized with operation of relays 514'', 516'' and 520'' (FIG. 3) by the current $i_2$. The alternation of testing and calibration is resumed whenever the measured signal voltage returns to its preset level selected with the aid of potentiometer 20.

It will be apparent that the circuit arrangement of FIG. 3 or FIG. 4 could be used in either of the two systems shown in FIGS. 1 and 2.

FIG. 5 shows another partial modification of the system of FIG. 3 wherein, however, the sensing circuit 11 has been replaced by a white-voise generator 22 working into an integrating network 23 in the input of an NPN transistor 18'' bridged across part of resistor 16. The integrated output of generator 22 varies the conductivity of transistor 18'' in an irregular pattern, between limits corresponding to a range of time constants equivalent to a conductivity period for multivibrator half 519b (not shown in FIG. 5) between a lower limit of, say, $0.5T_2$ and an upper limit of, say, $1.5T_2$ based on the value previously assumed for that period. It will be understood that the control circuit of FIG. 5 could be combined with that of FIG. 3 or FIG. 4, as by connecting transistor 18 in cascade with transistor 18'' or including transistor 18' in the network of FIG. 5. In such a combined system, the test intervals would fluctuate about a relatively short mean period in the presence of an input signal and would be extended to a relatively long period (possibly with complete suppression of the calibration interval) in the absence of such signal.

It will be noted that, whenever the calibration phase is suppressed for an extended or indefinite period, the system retains its most recent adjustment.

The white-noise generator 22 of FIG. 5 could be replaced by a source of pseudo-random voltage generated under the control of a programmer in an irregular but recurrent pattern. Such random or quasi-random modulation could also be imparted to the calibration phase instead of, or in addition to, the testing phase as specifically described above.

I claim:

1. A circuit arrangement for giving a calibrated indication of a parameter of an alternating signal voltage of predetermined frequency, comprising:
   circuit means connectable to a source of signal voltage to be measured;
   local oscillator means for generating a reference oscillation of said predetermined frequency;
   indicator means for measuring said parameter;
   sensing means for varying the transmission characteristic of said circuit means;
   automatic switchover means for alternately establishing a test position connecting said indicator means through said circuit means to said source and a calibrating position connecting said sensing means through said circuit means to said oscillator means; and
   threshold means connected to said circuit means for ascertaining the magnitude of said signal voltage in said test position and reducing the rate of operation of said switchover means upon said magnitude falling below a predetermined level.

2. A circuit arrangement for giving a calibrated indication of a parameter of an alternating signal voltage of predetermined frequency, comprising:
   circuit means connectable to a source of signal voltage to be measured;
   local oscillator means for generating a reference oscillation of said predetermined frequency;
   indicator means for measuring said parameter;
   sensing means for varying the transmission characteristic of said circuit means;
   automatic switchover means for alternately establishing a test position connecting said indicator means through said circuit means to said source and a calibrating position connecting said sensing means through said circuit means to said oscillator means; and
   threshold means connected to said circuit means for ascertaining the magnitude of said signal voltage in said test position and arresting the operation of said switchover means in said test position upon said magnitude falling below a predetermined level.

3. A circuit arrangement for giving a calibrated indication of a parameter of an alternating signal voltage of predetermined frequency, comprising:
   circuit means connectable to a source of signal voltage to be measured;
   local oscillator means for generating a reference oscillation of said predetermined frequency;
   indicator means for measuring said parameter;
   sensing means controlling said circuit means for varying the transmission characteristic thereof;
   astable multivibrator means provided with reactive circuitry for establishing a testing interval and a calibration interval alternating in a rhythm determined by the time constant of said circuitry;
   switch means controlled by said multivibrator means for connecting said indicator means through said circuit means to said source during said testing interval and for connecting said sensing means through said circuit means to said oscillator means during said calibration interval; and
   a generator of irregularly varying control voltages coupled to said reactive circuitry for altering said time constant.

4. A circuit arrangement for giving a calibrated indication of a parameter of an alternating signal voltage of predetermined frequency, comprising;
   circuit means connectable to a source of signal voltage to be measured;
   local oscillator means for generating a reference oscillation of said predetermined frequency;
   indicator means for measuring said parameter;
   sensing means controlling said circuit means for varying the transmission characteristic thereof;
   astable multivibrator means provided with reactive circuitry for establishing a testing interval and a calibration interval alternating in a rhythm determined by the time constant of said circuitry;
   switch means controlled by said multivibrator means for connecting said indicator means through said circuit means to said source during said testing interval and for connecting said sensing means through said circuit means to said oscillator means during said calibration interval;

voltage-responsive control means coupled to said reactive circuitry for altering said time constant; and a generator of input voltage including threshold means connected to said circuit means for ascertaining the magnitude of said signal voltage in said test position and actuating said control means to lower said time constant upon said magnitude falling below a predetermined level.

5. A circuit arrangement as defined in claim 4 wherein said indicator means comprises an amplitude meter.

6. A circuit arrangement as defined in claim 4 wherein said indicator means comprises a phase meter.

7. A circuit arrangement as defined in claim 6 wherein said circuit means includes a phase shifter controlled by said sensing means and a phase comparator following said phase shifter, said switch means comprising contacts interposed between said comparator and said meter, said threshold means comprising a voltage detector connected to said circuit means ahead of said comparator.

8. A circuit arrangement as defined in claim 4 wherein said switch means comprises at least one pair of relays in series with respective sections of said multivibrator means, said relays being provided with paired contacts respectively making and breaking upon energization of either of said sections.

* * * * *